(12) United States Patent (10) Patent No.: US 7,131,637 B2
Versteegh (45) Date of Patent: Nov. 7, 2006

(54) DEVICE FOR INSERTING WIRE OR CABLE INTO A LOOM

(76) Inventor: Fritz Versteegh, 922 Farr Ave., Escondido, CA (US) 92026

( * ) Notice: Subject to any disclaimer, the term of this patent is extended or adjusted under 35 U.S.C. 154(b) by 308 days.

(21) Appl. No.: 10/619,206

(22) Filed: Jul. 14, 2003

(65) Prior Publication Data

US 2005/0011579 A1 Jan. 20, 2005

(51) Int. Cl.
*B63B 35/03* (2006.01)
*B65H 59/00* (2006.01)
*E21C 29/16* (2006.01)
*H02G 1/08* (2006.01)

(52) U.S. Cl. .............................. 254/134.3 R; 140/123

(58) Field of Classification Search .................. 29/755; 59/78.1; 140/29, 92.1, 102, 120, 123, 123.5, 140/123.6, 147; 191/12 R; 57/23; 254/134.3 R, 254/134.3 FT See application file for complete search history.

(56) References Cited

U.S. PATENT DOCUMENTS

| 5,884,901 A | * | 3/1999 | Schilling | ............. 254/134.3 R |
| 6,550,137 B1 | * | 4/2003 | Ferrand | ....................... 29/755 |
| 6,655,014 B1 | * | 12/2003 | Babini | ......................... 29/755 |
| 6,749,179 B1 | * | 6/2004 | Supkis et al. | ......... 254/134.3 R |

* cited by examiner

*Primary Examiner*—Jack Keith
*Assistant Examiner*—Hung C. Le
(74) *Attorney, Agent, or Firm*—David B. Waller & Associates

(57) ABSTRACT

A device for inserting wire or cable into a loom having a pre-cut slit along its length comprising a splitter means to separate the loom along its length and a wire insertion means affixed to the splitter means to guide at least one wire or cable into the loom as the device is drawn along the length of the loom.

7 Claims, 3 Drawing Sheets

DEVICE FOR INSERTING WIRE OR CABLE INTO A LOOM

CROSS-REFERENCE TO RELATED APLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

TECHNICAL FIELD

Figure 1A:
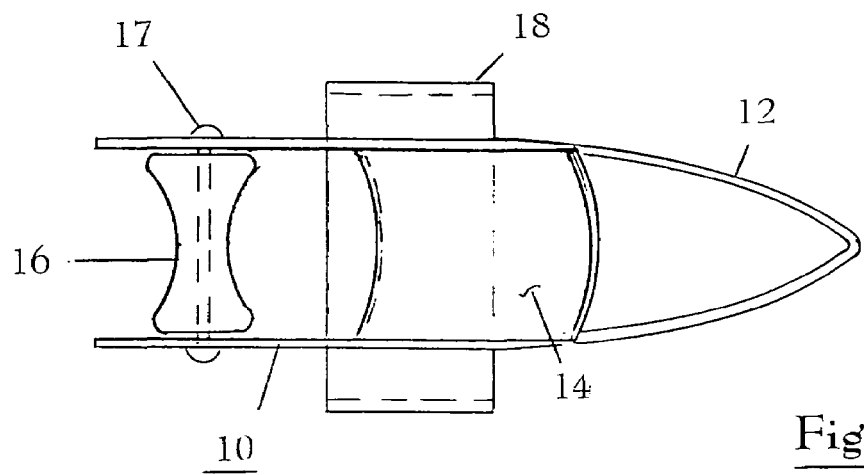

The present invention relates to tools used in the assembly of wire or cable looms. In particular, a device for inserting wire or cable into a loom.

BACKGROUND OF THE INVENTION

In the assembly of wiring and cable harnesses, the use of wire looms is commonplace. Wire looms are used in a wide array of applications including automotive, electro-mechanical devices, computer and accessory wiring, and numerous others. Generally, wire looms are corrugated, flexible tubing with a pre-cut slit along its length that allows for the insertion of wires and/or cables. The looms come in a variety of diameters to accommodate one or more wires or cables of varying sizes.

Typically, the wires or cables are inserted manually by splitting the loom with the fingers of one hand while inserting the wires or cables with the other hand. To do this, the installer generally slides his or her fingers along the slit providing an opening to allow insertion of the wires as the operation moves along the length of the loom. Gloves may be used to protect the fingers from the edges of the loom but this only makes the operation more difficult and clumsy, especially with smaller diameter sized looms. Unfortunately this is a difficult, time-consuming operation that is hard on the hands and fingers.

A blunt tool, such as the blade of a screwdriver, may be used in lieu of one's fingers to spread the wire loom. However, this still provides an awkward and unstable operation, with the blunt tool easily slipping out of the slit as it is dragged along the length of the loom and if it comes in contact with the user it could cause injury.

One device currently available commercially at www.cableorganizer.com provides a single molded plastic piece that folds in half forming a leading edge with a tubular shaft behind, and at an acute angle to, the leading edge. In use, the leading edge is inserted into the loom creating an opening along the slit. Wires or cables are inserted into the loom through the tubular shaft as the device is drawn along its length. However, this device has a tendency to open during operation, releasing the wires and making insertion difficult.

It is also necessary that the operator use one hand to bunch the wires while using the other hand to move the device along the loom. Unfortunately this method of operation makes it easy for the device to slip out of the slit in the loom during wire installation.

Consequently, there is a need for a device that provides a means to separate the loom along its length for ease of insertion of wires or cables, with a means to maintain the device within the loom during the operation.

BRIEF SUMMARY OF THE INVENTION

One aspect of the present invention provides a device for inserting wire or cable into a loom having a pre-cut slit along its length comprising a splitter means to separate the loom along its length and a wire insertion means affixed to the splitter means to guide at least one wire or cable into the loom as the device is drawn along the length of the loom. In one embodiment, the splitter means comprises two sides having a common front end and coordinating back ends. The sides are generally parallel and spaced apart not less than ¼ inch and not more than 3 inches. The front ends of the sides are joined together forming a wedge shape.

In another embodiment, the wire insertion means comprises a wire feed channel and a roller to assist in guiding at least one wire or cable into the loom. The wire feed channel is positioned behind and in line with the splitter means and the roller is positioned behind and in line with the wire feed channel. Preferably, the roller is affixed between the two sides and behind the wedge shaped front end.

In another aspect of the invention, the device further comprises a containment means to prevent the splitter means from disengaging the loom. The containment means comprises at least one generally circular loop having two ends. The generally circular loop is connected to at least one side by at least one end of the loop and perpendicular to the sides. The at least one generally circular loop is either removably or permanently affixed to at least one side. Preferably, the containment means comprises two loops.

In yet another aspect of the invention, a method of inserting wire or cable into a pre-cut loom is provided comprising inserting the above described device into the wire loom to separate the loom along its length and depositing at least one wire or cable into the device and drawing the device along the length of the wire loom.

BRIEF DESCRIPTION OF THE SEVERAL VIEWS OF THE DRAWING(S)

Figure 1B:
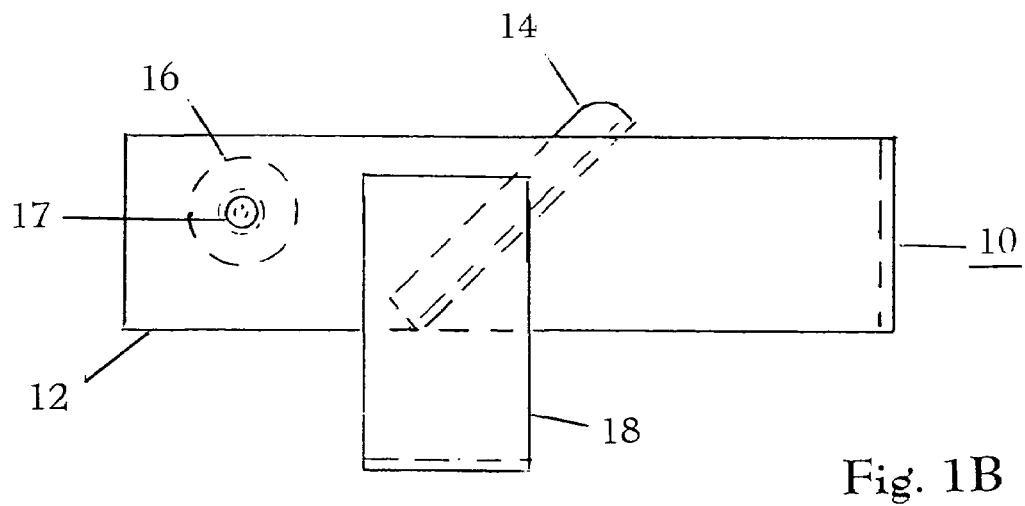
Figure 1C:
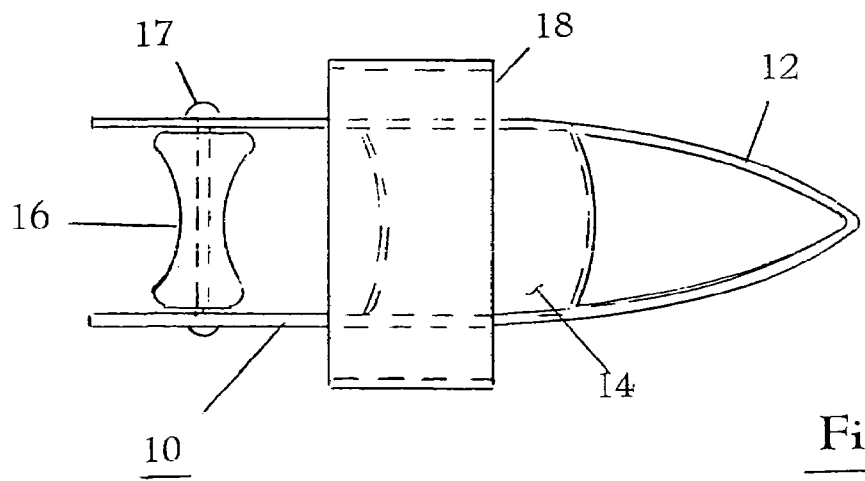
Figure 2A:
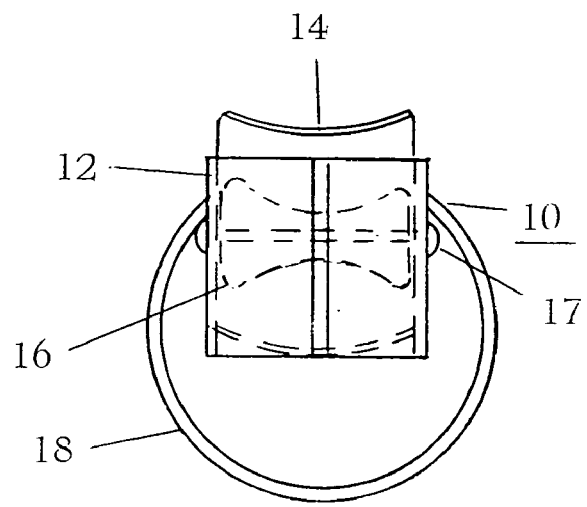
Figure 2B:
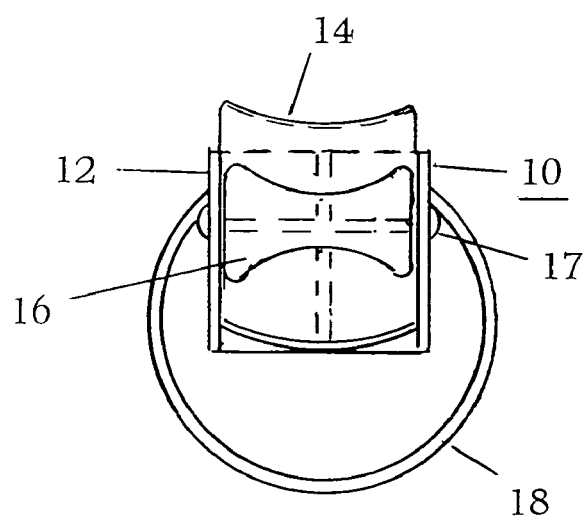
Figure 3A:
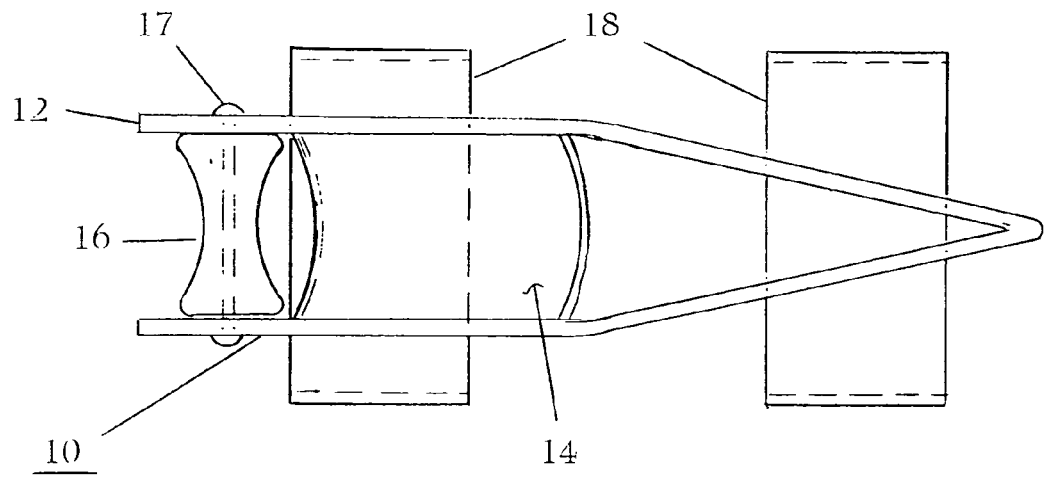
Figure 3B:
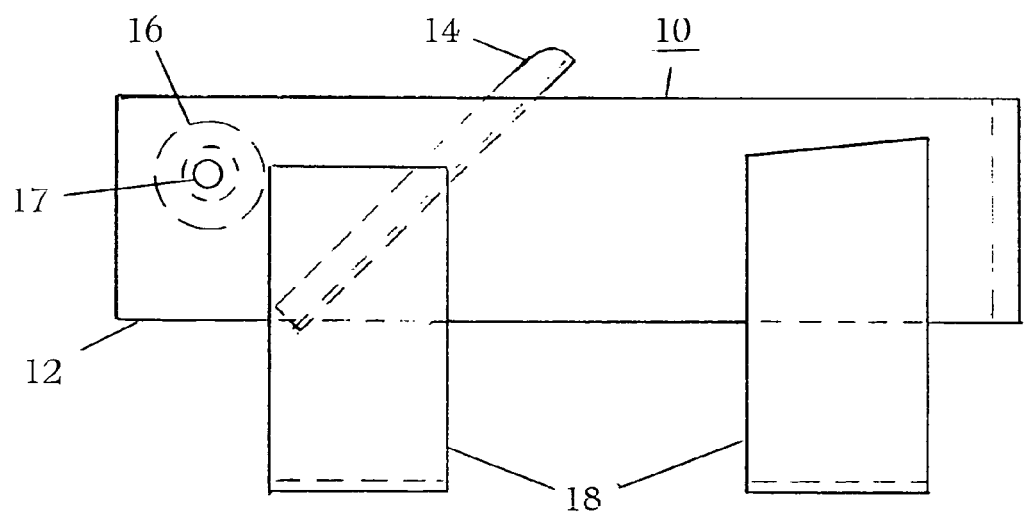

FIG. 1: Is a diagrammatic representation of one embodiment of the device of the present invention showing (A) the top view, (B) the side view, and (C) the bottom view; and FIG. 2: Is a diagrammatic representation of the device shown in FIG. 1 showing (A) the front view, and the back view; and FIG. 3: Is a diagrammatic representation of one embodiment of the device of the present invention with two containment loops showing (A) the top view and (B) the side view.

DETAILED DESCRIPTION OF THE INVENTION

Unless defined otherwise, all terms used herein have the same meaning as are commonly understood by one of ordinary skill in the art to which this invention belongs. All patents, patent applications and publications referred to throughout the disclosure herein are incorporated by reference in their entirety. In the event that there is a plurality of definitions for a term herein, those in this section prevail.

The term "containment" as used herein refers to a means for securely, yet freely, maintaining, retaining or holding an item on the device of the present invention, such as, for example a loop affixed to the side of a splitter means that prevents the loom from slipping off or being unintentionally released from the device.

The term "affixed" as used herein refers to a means for connecting one element of the device to another element by a variety of means known to one skilled in the art, such as, for example by thread, adhesive or braising.

The term "wire" or "cable" as used herein refers to an elongated filament that may or may not be electrically conductive and made of a variety of materials such as for example, metal, polymer, glass fiber, optical fiber, or other elongated, flexible material that could be inserted into a wire loom.

The terms "loom", "wire loom", "cable loom" or "wire or cable loom" as used herein refer to a flexible encasement tubing commonly used to bind and or protect groupings of wires, typically made from corrugated plastic materials in a tubular shape and having a slit running along its length for insertion of cable or wire.

The term "channel" as used herein refers to an elongated aperture or opening in which wires or cables may be inserted for feeding into a wire or cable loom.

The terms "generally circular loop" as used herein refers to geometric configuration of a generally elongated element of the invention that is molded or bent such that one end of the element is brought in close proximity to the other end forming a primarily circular shape. This primarily circular shape may be round, square, rectangular, triangular or any combination of these shapes.

The present invention is a device 10 for inserting wire or cable into a loom having a pre-cut slit along its length comprising a splitter means 12 to separate the loom along its length and a wire insertion means 14 affixed to the splitter means 12 to guide at least one wire or cable into the loom as the device 10 is drawn along the length of the loom. A variety of configurations known to those skilled in the art may be used to construct the device 10 of the present invention.

Splitter Means

The splitter means 12 is an element that spreads the pre-cut slit in the wire loom sufficiently to allow easy insertion of wires, cables or a set of wire or cables into the wire loom. In one preferred embodiment, the splitter means 12 comprises two sides having front ends and a back ends, wherein the sides are generally parallel and spaced apart not less than ¼ inch and not more than 3 inches. The front ends of the sides are joined together forming a wedge shape. They may be joined by a variety of means known to those skilled in the art such as for example snap-fit, press-fit, adhesive, brazing or welding. The front edge of the wedge shape is preferably blunt to allow ease of passage through the pre-cut slit in the wire loom. One skilled in the art would recognize that the spacing between the sides is dependent on the desired wire loom diameter. More particularly the spacing should be sufficient to allow the sides to maintain the wire loom in a sufficiently open position to allow insertion of the wires or cables yet not so large as to cause the loom to come in contact with the containment means 18 interfering with ease of use. Generally the opening created by the splitter means 12 should not exceed the diameter of the loom. For example, for wires that are of a gauge used for speaker wires which are to be inserted into a ½ inch nominal wire loom size, the spacing should not exceed ½ inch and not be less than ⅛ inch.

One skilled in the art would recognize that the length of the sides is dependent on the size of the wire loom to be used with the device 10. Preferably the length of the sides is not less than about three times and not more than about ten times the diameter of the loom. In general, the length of the sides is not less than one inch and not more than 14 inches. Preferably, the length of the sides is not less than 1½ inches and not more than 12 inches. Similarly, the height of the sides will be dependent on the diameter of the wire loom and the number of wires being inserted. The sides are not less than about two times and not more than about five times the diameter of the loom. For example, if the wire loom is nominally ⅝ inch in diameter, the height of the sides is not less than 1¼ inch and not more than 5 inches; preferably the height is not less than 1 inch and not more than 3 inches. In order to provide a means to more securely hold the device 10 during use, a gripping means may be provided on the upper portion of the sides. The gripping means may be made of a variety of materials known to those skilled in the art for increasing friction between the user's fingers and the device 10. Such materials include for example rubber, Neopreme™ and texturing the surface of the upper portion of the sides.

The thickness of the sides may vary depending on how they are constructed. If the sides are constructed from sheet stock materials the thickness will generally be uniform. If they are cast the thickness may vary depending on the characteristics of the mold. In addition, the thickness will vary depending on the type of material used to construct the sides. Preferably the material is rigid such as metal. In this case the thickness of the sides may be not less than about 1/16 inch and not more than about ⅛ inch. If the sides are made of a less rigid material such as polymer plastic, the thickness of the sides may be greater to provide additional strength such as, for example, not less than about 3/32 inch to not more than about 5/32 inch.

If the sides are form molded they may not necessarily be uniform in thickness. For example, if the sides are form molded as a single piece, the wedge shaped front end may be preferably thicker than the trailing sides providing additional strength and rigidity.

In general the splitter means 12 may be constructed from a variety of materials known to one skilled in the art that provide sufficient strength and durability to withstand the service of the operation. The material should be resistant to the wear encountered by the device 10 being drawn through the wire looms. For example, the sides and splitter means 12 may be constructed of polymer plastic, high-density polymer, ceramic or metal. Preferably, the device 10 is made of a low cost resilient high-density polymer.

Wire Insertion Means

The wire insertion means 14 refers to a variety of means for directing the wires into the wire loom after the splitter means 12 provides a sufficient opening in the wire loom slit. In one preferred embodiment the wire insertion means 14 may be provided as a tube or a generally flat surface for guiding the wire or cable into the loom. The flat surface is preferably concave along its length forming a wire feed channel. The wire feed channel is positioned behind and in line with the wedge shaped front end of the splitter means 12 between the two sides. The wire feed channel is affixed to at least one of the sides and extends generally from about the bottom of the sides to a nominal distance above the top of the sides. The channel is angled such that the top is positioned toward the front end of the splitter means 12 and the bottom is positioned toward the back end. One skilled in the art would recognize that the angle of the channel could affect the amount of force necessary to operate the device 10. For example, as the channel is angled more parallel to the loom the amount of force to operate the device 10 may be decreased. In contrast, more force may be necessary to operate the device 10 if the angle of the channel is decreased with respect to the loom (i.e. angling the channel more perpendicular to the loom). In either case, the angle of the wire feed channel is not less than 15 degrees and not more than 75 degrees. Preferably the angle is not less than 25 degrees and not more than 65 degrees and most preferably not less than 35 degrees and not more than 55 degrees. The wire feed channel may be constructed from a variety of materials known to one skilled in the art. Preferably it is made of the same material as that used in construction of the splitter means 12.

The length of the wire feed channel will vary depending on the height of the sides. Preferably the length of the wire feed channel is not less than about ½ the height of the sides and not more than about the 1.4 times the height of the sides. In general the length of the wire feed channel is not less than about ½ inch and not more than 8 inches.

To increase the ease of use, the insertion means may further comprise a roller 16. The roller 16 of the wire insertion means 14 is positioned behind and in-line with the wire feed channel. The roller 16 maybe rotatably affixed between the two sides by a variety of methods known to one skilled in the art including for example, by use of a pressed pin, a bolt and nut, a rivet, or other such mechanical fitting 17. The surface perimeter of the roller 16 preferably comprises a groove to provide a seat for the wire or cable as it moves over the roller 16 during insertion into the loom. The roller 16 is positioned such that an opening is provided between the groove and the wire feed channel to accept the wire(s) or cable(s) for insertion into the pre-cut wire loom. The width of the roller 16 is preferably slightly less than the interior spacing between the sides. For example, if the spacing between the sides were one inch, the width of the roller 16 would preferably be not less than ⅞ inch. One skilled in the art would recognize that the diameter of the roller 16 is dependent on the height of the sides. Preferably the outside diameter of the roller 16 is not less than about one-half and not more than about the height of the side. In general the outside diameter of the roller 16 is not less than about ⅝ inch and not more than about 5 inches. The width and depth of the groove will depend on the size and number of wires being inserted into the loom. For example if the wires or cables are bundled having a diameter of 1 inch the groove is preferably about ½ inch in depth and about 1 inch wide.

The roller 16 may be constructed of a variety of materials known to one skilled in the art that provide sufficient strength and durability to withstand the service of the operation. For example, the roller 16 may be constructed of polymer plastic, high-density polymer, wood or metal.

Containment Means

The containment means 18 prevents the wire loom from disengaging the splitter means 12 and may be provided in a variety of configurations known to those skilled in the art. In one configuration the containment means 18 is affixed to at least one side of the splitter means 12 and encircles the wire loom, preventing the wire loom from slipping off the splitter means 12 during the operation of the device 10. In one embodiment, the containment means 18 comprises at least one generally circular loop having two ends, wherein one of the ends is connected to at least one side such that the circular loop is generally perpendicular to the side. The circular loop may be constructed of a material capable of being formed, fabricated, molded or machined into a generally circular shape. For example, a flat bar material or a round rod stock material may be formed into a loop shape to provide an interior surface that allows the wire loom to move easily through the loop. The containment means 18 may be constructed of metal, high-density plastic, polymer or ceramic. Preferably, the containment means 18 is constructed of the same material as the splitter means 12. The thickness of the loop is preferably not less than about 1 to not more than about 2 times the thickness of the material used to construct the sides of the splitter means 12. The length of the loop will be just longer than the circumference of the largest loom intended for use with the device 10. A sufficient loop width may be determined based on the diameter of the loom. For example, the loop width may be about the same or about twice that of the diameter of the loom in which wires or cables are being inserted. More particularly, if the loom is 1 inch in diameter it may be beneficial to have a single loop width of from about 1-inch to about 2 inches.

The containment means 18 may be affixed to the splitter means 12 by a variety of methods. For example, if the material used to construct the device 10 is plastic, the circular loop could be form molded onto the splitter means 12. Alternatively, if the material used to construct the device 10 is metal, the circular loop could be brazed or welded onto at least one side of the splitter means 12. The containment means. 18 may be affixed to at least one side of the device 10 and positioned such that it is generally beneath the wire feed channel and most preferably beneath the opening created between the wire feed channel and the roller 16. Affixing of the containment means 18 to a side may be removable or permanent. If the loops are affixed removably a press-fit or snap-fit construction may be utilized. Correspondingly if affixing is permanent an adhesive or brazing may be the method of choice.

In another embodiment of the present invention, the containment means 18 comprises two loops. One skilled in the art would recognize that the number of loops utilized would primarily depend on the size of the loom selected and the dimensions of the stock material used to construct the containment means 18. For example the larger the diameter of the loom or bundle of wires to be inserted into the loom the more loops may be desired to increase ease of use. Alternatively, a single loop having a width dimension similar to that encompassed by two loops may be used. For example if two loops are preferred for the construction of the device 10 and the width spanned by those two loops is four inches a single loop having a width of four inches may be used in place of the two loops.

Assembly

The present invention may be provided to the consumer in fully assembled form or in disassembled form. Preferably, the manufacturer assembles the device 10. Assembly is dependent on the type of materials used in the construction. For example, if polymer plastics are used, a number of the elements may be form molded into a single piece reducing assembly time. Correspondingly if sheet stock material is used such as metal sheet stock, the pieces may be cut and/or formed separately.

In the case of polymer plastics, the splitter means 12 and sides could be molded as a one-piece assembly. Bendable hinges may be provided at the bottom of each side. A divider having a width similar to the width of the roller 16 may separate these bendable joints. When the sides are folded along their respective joints the divider forms the base of the device 10. In addition, the wire insertion channel may be molded into one of the sides such that when the sides are folded along their joints a complete wire insertion channel is formed. Further one side may be provided with an aperture to accept the end of a pin 17 and the other side may be provided with a pin 17 for retaining the roller 16 wherein the far end of the pin 17 has a snap-fit or press-fit adapter so that when the sides are folded along their joints this end may be snap-fit or press-fit into the aperture of the other side. In addition, slots may be provided to hold the circular loops in place, which may also be form-molded as part of the one-piece assembly. These slots may be used to affix the loops permanently such as with adhesive or removably such as snap-fit to the sides of the device 10.

In the case where the device 10 is provided as a single form molded piece, assembly would comprise placing the roller 16 on the pin 17, bending the side upward along a crease provided between the base of the side, then bending the next side along the crease provided and the base of the side and snapping or otherwise affixing the pin 17 holding the roller 16 into the adjoining aperture for the pin 17 on the side now parallel to the first bent side. An affixing means such as snaps may also be provided along the wedge shape edge of the splitter means 12 and the side of the wire insertion means 14. Once both sides are secured, the containment means 18 loops may be affixed into the slots provided by, for example, snap fit or adhesive.

In the case where the device 10 is provided in multiple pieces such as for example if the device 10 were constructed of metal, the splitter means 12 could be formed by bending a piece of flat bar material, creating a wedge shape for the front edge and two sides. Alternately, the two sides may be formed separately and later joined together. In either case the apertures for the containment means 18 loops and roller pin 17 are created, such as by drilling, prior to joining the sides. In addition, the wire feed channel and roller pin 17 are affixed in place on one of the sides prior to joining. Upon assembly the two sides are joined together and the connecting points affixed. In the case of preparing a metal device 10 connecting points would most likely be welded or braised. This includes securing the roller pin 17 on one or both sides of the device 10, securing the wire feed channel to one or both sides of the device 10 and securing the containment means 18 loops to one or both sides of the device 10. In the case where the sides are formed separately, the front end may be welded or brazed, forming a smooth blunt edge.

The device 10 for inserting wire or cable into a wire loom may be provided individually or in a kit that would include a variety of different sized devices for different sized wire looms. The device 10 could come completely assembled or in disassembled form. Preferably the device 10 is provided in assembled form to the consumer.

Use

Once the length of the wire loom has been determined and cut to the proper length, the wedge shape of the splitter means 12 is inserted into the pre-cut slit of the wire loom. As the device 10 is moved forward slightly, the containment means 18, consisting of one or more circular loops, is allowed to slip over the wire loom, thereby encircling and retaining the wire loom during operation. As the splitter means 12 moves along the length of the wire loom it spreads and opens the slit in the wire loom creating a pocket. Initially, one or more wires or cables are inserted into the insertion means between the channel and the roller 16 and pushed through so that they extend a desired length beyond the end, starting end, of the wire loom.

To install the wires or cables into the wire loom, the operator either holds or affixes the wires or cables that extend beyond the starting end of the loom and pulls or pushes the device 10 along the length of the wire loom. The free wires or cables are drawn into the wire insertion means 14, assisted and positioned by the wire feed channel and roller 16. The device 10 is moved along the length of the wire loom until reaching the opposite end, leaving the wires or cables extending out of the end.

At times, it may be desirable to have wires or cables exit the wire loom at an intermediate point in its length. This can be accomplished by stopping the movement of the device 10 at the prescribed point, reaching in the opening created by the sides behind the roller 16 and extracting the particular wires or cables, allowing the loose ends to be pulled through the wire insertion means 14.

The use of removably affixed circular loop containment means 18 would allow the device 10 to initiate the insertion of wires or cables at an intermediate point in the length of the wire loom. Herein, at least one end of the circular loops is disengaged from the side and then the wedge shape of the splitter means 12 is inserted into the wire loom at the intermediate point. The circular loops are then reconnected to the side to retain the wire loom and the wires or cables are inserted into the insertion means between the channel and roller 16. The wires or cables so inserted are held in place and the device 10 is pushed or pulled along the length of the wire loom to the desired location where the wires or cables are then extracted, or to the end of the loom where the wires or cables exit the loom.

I claim:

1. A device for inserting wire or cable into a loom having a pre-cut slit along its length comprising: a splitter means to separate the loom along its length and a wire insertion means affixed to said splitter means to guide at least one wire or cable into said loom as said device is drawn along the length of said loom, wherein said wire insertion means comprises a wire feed channel and a roller to assist in guiding at least one wire or cable into said loom wherein said wire feed channel is positioned behind and in line with said splitter means and wherein said roller is positioned behind and in line with said wire feed channel.

2. A device according to claim 1 wherein said splitter means comprises two sides having a front end and back ends, said sides are generally parallel and spaced apart not less than ¼ inch and not more than 3 inches, said front end of said sides are joined forming a wedge shape.

3. A device according to claim 2 further comprising a roller affixed between said two sides and behind said wedge shaped front end forming a wire feed channel able to accept at least one wire or cable for insertion into said loom having a pre-cut slit along its length.

4. A device according to claim 1 wherein said splitter means comprises containment means to prevent said splitter means from disengaging said loom having a pre-cut slit along its length.

5. A device according to claim 4 wherein said containment means comprises at least one generally circular loop having two ends, said generally circular loop connected to at least one side by at least one end of said generally circular loop perpendicular to said sides such that said loom having a pre-cut slit along its length is retained on said splitter means.

6. A device according to claim 5 wherein said containment means comprises two generally circular loops.

7. A device according to claim 5 wherein said at least one generally circular loop is removably affixed to said at least one side.

* * * * *